United States Patent
Baker et al.

(10) Patent No.: US 9,264,769 B2
(45) Date of Patent: Feb. 16, 2016

(54) USER VIEWING DATA COLLECTION FOR GENERATING MEDIA VIEWING ACHIEVEMENTS

(71) Applicant: Google Inc., Mountain View, CA (US)

(72) Inventors: Erica Baker, Santa Clara, CA (US); Richard William Bragg, Los Altos, CA (US); Jason Bayer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/242,581

(22) Filed: Apr. 1, 2014

(65) Prior Publication Data

US 2015/0281773 A1 Oct. 1, 2015

Related U.S. Application Data

(63) Continuation of application No. 13/283,777, filed on Oct. 28, 2011, now Pat. No. 8,719,854.

(51) Int. Cl.
*H04N 21/442* (2011.01)
*H04N 21/4788* (2011.01)

(52) U.S. Cl.
CPC ..... *H04N 21/44204* (2013.01); *H04N 21/4788* (2013.01)

(58) Field of Classification Search
USPC ................................... 725/12, 14
See application file for complete search history.

(56) References Cited

U.S. PATENT DOCUMENTS

| 2002/0133817 | A1 | 9/2002 | Markel |
| 2004/0073915 | A1 | 4/2004 | Dureau |
| 2004/0255322 | A1 | 12/2004 | Meadows et al. |
| 2006/0156329 | A1 | 7/2006 | Treese |
| 2007/0118848 | A1 | 5/2007 | Schwesinger et al. |
| 2007/0283398 | A1 | 12/2007 | Bowles |

(Continued)

FOREIGN PATENT DOCUMENTS

| JP | 2005275740 | 10/2005 |
| WO | WO 2006/059266 | 6/2006 |

OTHER PUBLICATIONS

Battlefield 2 Stats page, Feb. 2, 2006, http://web.archive.org/web/20060202174913/http://bf2s.com/player/45719422/ entire document.*

(Continued)

*Primary Examiner* — Hunter B Lonsberry
(74) *Attorney, Agent, or Firm* — Byrne Poh LLP

(57) ABSTRACT

Methods, systems, and apparatuses, including computer programs encoded on computer-readable media, for receiving user viewing data that includes a media source, a viewing time, and a username. The username identifies a user, and the user viewing data is associated with a media viewing device. The user viewing data is recorded by passively monitoring user input to the media viewing device. A program viewed on the media viewing device is determined based upon the user viewing data. A plurality of viewing achievement rules are stored in memory. The viewing achievement rules include one or more criteria based upon user viewing data. At least one achievement rule comprises a criterion that a user view the program. If the user viewing data matches the criteria of one or more of the viewing achievement rules is determined. An indication of one or more achievements is stored in association with the username.

18 Claims, 4 Drawing Sheets

(56) References Cited

U.S. PATENT DOCUMENTS

| | | | |
|---|---|---|---|
| 2009/0082101 A1 | 3/2009 | Ostergren et al. | |
| 2009/0083779 A1 | 3/2009 | Shteyn et al. | |
| 2009/0132271 A1 | 5/2009 | Typaldos | |
| 2009/0133048 A1 | 5/2009 | Gibbs et al. | |
| 2009/0282437 A1 | 11/2009 | Malec et al. | |
| 2009/0326970 A1 | 12/2009 | Estrada et al. | |
| 2010/0280641 A1 | 11/2010 | Harkness et al. | |
| 2012/0047017 A1* | 2/2012 | Hernandez et al. | 705/14.55 |
| 2012/0272258 A1* | 10/2012 | Bedi | 725/14 |
| 2013/0006682 A1 | 1/2013 | Huff et al. | |

OTHER PUBLICATIONS

International Preliminary Report on Patentability dated Apr. 29, 2014 in International Patent Application No. PCT/US2012/056022.

International Search Report dated Jul. 29, 2013 in International Patent Application No. PCT/US2012/056022.

Written Opinion dated Apr. 28, 2014 in International Patent Application No. PCT/US2012/056022.

Supplementary European Search Report and the European Search Opinion dated Jun. 30, 2015 in European Patent Application No. 12769259.8.

\* cited by examiner

USER VIEWING DATA COLLECTION FOR GENERATING MEDIA VIEWING ACHIEVEMENTS

CROSS-REFERENCE TO RELATED APPLICATIONS

This application is a continuation of U.S. patent application Ser. No. 13/283,777, filed Oct. 28, 2011, which is hereby incorporated by reference herein in its entirety.

BACKGROUND

Media can be viewed by users through various devices. Users can actively provide an indication that they have viewed a particular program. For example, a user can actively select a particular episode of a television series and indicate that the episode was viewed on a particular date.

SUMMARY

In general, one aspect of the subject matter described in this specification can be embodied in methods for receiving user viewing data that includes a media source, a viewing time, and a username. The username identifies a user, and the user viewing data is associated with a media viewing device. The user viewing data is recorded by passively monitoring user input to the media viewing device. A program viewed on the media viewing device is determined based upon the user viewing data. A plurality of viewing achievement rules are stored in memory. The viewing achievement rules include one or more criteria based upon user viewing data. At least one achievement rule comprises a criterion that a user view the program. If the user viewing data matches the criteria of one or more of the viewing achievement rules is determined. An indication of one or more achievements is stored in association with the username based upon the determination that the user viewing data matches the criteria of one or more of the viewing achievement rules. Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Users can watch various media, such as television shows, movies, previews, video clips, music videos, etc., through various devices and various media sources. User viewing data can be collected while the viewer watches media. Such collection can be based upon the user giving permission to allow such data collection. The user viewing data can include an indicator or identifier of a source of the media, and a time the media was watched. Users can be awarded various achievements, badges, etc. based upon the media watched and how/where the media was viewed. Achievements can be shared with others through social media networks, email, web pages, etc.

Figure 1:
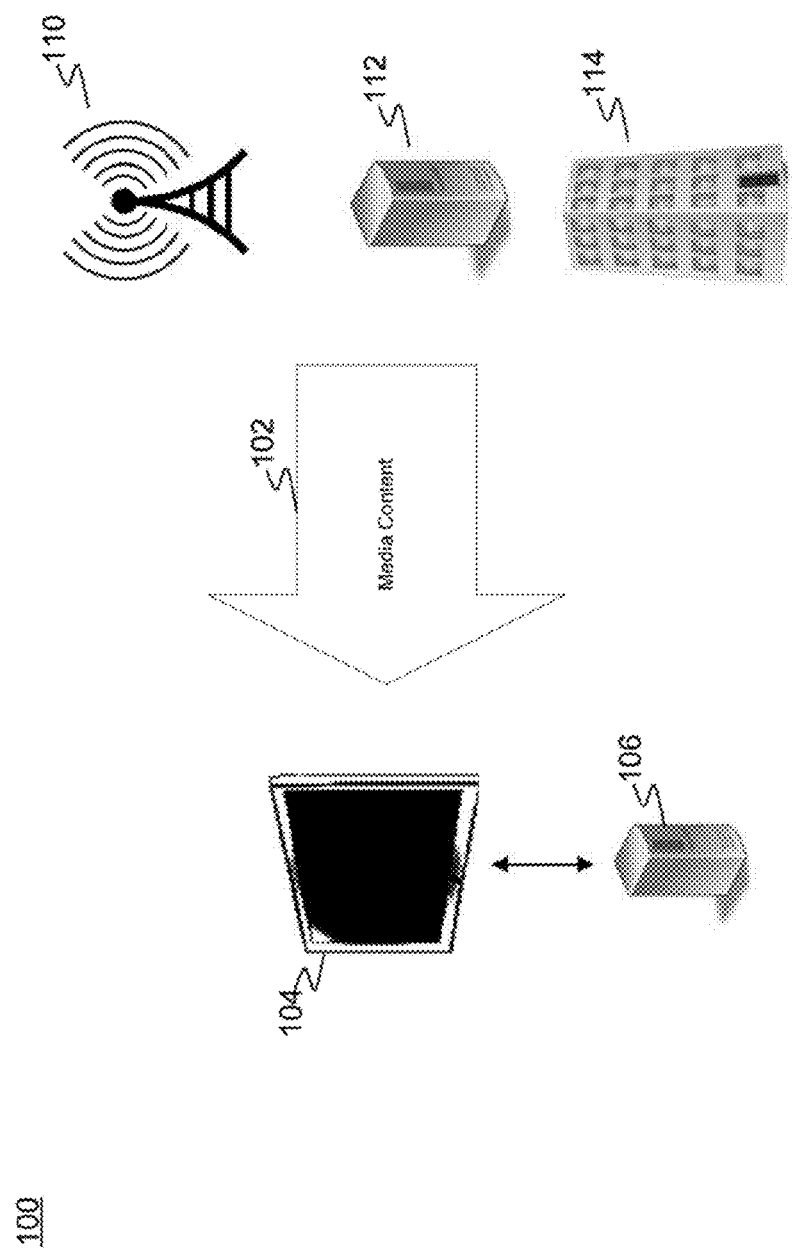
FIG. 1 illustrates a block diagram of an example of a media viewing achievement system in accordance with an illustrative implementation.

FIG. 1 illustrates a block diagram of an example of a media viewing achievement system in accordance with an illustrative implementation. Media content 102 is provided to a device 104 from various content providers 110, 112, and 114. Content providers can include cable television providers 114, cellular data providers 110, data network providers 112, satellite television providers (not shown), etc. Data network providers 112 can include providers that allow users to access content over data networks such as the internet.

In one embodiment, device 104 can be a television or an external set-top box (not shown) connected to the television. A user can login to the device 104 by providing a username and optionally a password or other credentials. A user can also login into a device based upon a username that can be a cookie, an icon, an identifier, etc. Alternatively, the device may determine the user of the device using another form of user determination, such as by recognizing features of the user to characteristics of the user's watching habits, such as time or programming type. Upon receiving the username, the device 104 associates the content received by the device 104 as being watched by the user. The device 104 can then determine if user viewing data will be collected as the user watches media. In one implementation, before any user viewing data is collected, the user can opt in to allow the user viewing data collection. In this implementation, user viewing data will not be collected for any user that does not opt in. In an alternative implementation, the username and optionally the password can be sent to a remote computing device 106. The remote computing device can associate the username with a particular device and determine if user viewing data can be collected (e.g., based on a user preference stored at a server after being received from any of a number of computing devices). An indication regarding if the user viewing data should be collected or not can be sent to the device 104, and the device 104 can collect user viewing data based upon the received indication.

As a user watches media on the device 104, user viewing data is passively collected. That is, user viewing data is collected without requiring any input specific to collect user viewing data beyond the user's initial login. User viewing data can include data indicating the user's interaction with the device 104. For example, a user changing a channel, turning on the device 104, turning off the device 104, changing the volume, requesting data about media, fast forwarding media, rewinding media, pausing media, watching a particular content item or a portion thereof, watching a particular channel (e.g., cable, satellite, television, or web channel such as a Youtube channel), watching a particular media source (e.g., Hulu, Netflix, etc.), etc. The user viewing data can also include a time or time range of the user interaction and a media source of the media being viewed. The media source can be, but is not limited to, a television channel, a uniform resource locator (URL), etc. Additionally, the user viewing data can include one or more of an indicator of the device associated with the user, the type of device (e.g., set-top box, smartphone, tablet PC, etc.), etc. Further, the user viewing information can include the username.

The user viewing data can include an indication that media was viewed in a picture-in-picture and/or picture-and-picture display portion of a device. The device 104 or another device can allow a user to request data from various sources, such as the internet, etc. The requested information can include information related to a user's request for data. For example, while watching a particular program a user may do a search for an actor that stars in the watched program. The user viewing data can include URLs viewed by a user, keywords used to search data, etc.

The user viewing data can be used to derive supplemental data that can be added to the user viewing data. For example, user viewing data that includes a media source and the time the media source was viewed can be used to determine the title of the viewed media. As an example, user viewing data may indicate that a particular television channel was watched at a particular time. Using this information, television listing data can be used to determine one or more particular shows, movies, etc., viewed at the device. As another example, the user viewing data may indicate that a particular URL was viewed. The URL can be used to determine what media, such as a video clip, television show, movie, etc., was viewed at the device. An indication of the shows that were viewed at the device can be added to the user viewing data. In addition to determining the title of the viewed media, additional information such as the actors in the media, if the media was a live broadcast, if the media was a first-run network broadcast, a syndicated broadcast, etc. can be determined in a similar manner as the title. In addition, data such as how much of a particular series/season of a particular program has been viewed, how many media titles overall have been viewed, how much media has been viewed, etc., can be calculated.

In addition, the user viewing data can be used to verify the media that was displayed on a device. For example, the time a particular media source was viewed can be used to verify that the media was viewed in its entirety. Additional user viewing data can also determine if the user fast forwarded, paused, skipped, etc. through the media. Using information associated with media, a length of the media can be determined. This length can be used to determine how much of the media a user viewed. For example, the amount of a television show watched by a user can be determined from the user viewing data. Information concerning the television show can include the time the television show starts and ends on a particular television channel. Using the user viewing data, the amount of the television show viewed by a user can be calculated. The media source and the time interval that the user watched the media source can be used to determine how much of the television show was viewed. For example, a user can be deemed to have watched an entire television show if a predetermined amount of time, such as but not limited to, 90%, 95%, 100%, etc. was viewed.

Achievements can be awarded based upon analysis of the user viewing data. In one implementation, the device includes a set of achievement rules that are used to determine if an achievement should be awarded to a user. The set of achievement rules can be retrieved and/or received from a remote computing device 106. At various times, updates and/or changes to the set of achievement rules can be requested and/or received from the remote computing device 106. The device 104 can include a storage medium to store user viewing data from multiple viewing sessions. A viewing session can include all of the user viewing data for a particular amount of time, for example, the time between when the device 104 is turned on to the time the device 104 is turned off. User viewing data, therefore, can span a long period of time, such as months, years, etc. The user viewing data associated with a single user across multiple viewing sessions can be combined and the set of achievement rules can be applied to the combined set of user viewing data. If the user viewing data matches any of the achievement rules, an achievement associated with the username of the user can be awarded. Once awarded, a user can review awarded achievements through the device 104 and/or through another interface, such as a web page. In addition, the achievements can be shared and/or posted, for example, through a social networking site, to a web page, through email, etc. For example, an achievement can include a visual icon indicating a particular accomplishment. This visual icon can be posted to a wall or stream of a social networking site. In addition, achievements can be displayed in a particular area of a social networking site, on a web site, etc. Achievements can be stored at the remote computing device 106 or on devices 104, 106, 204, 206.

In another implementation, the user viewing data can be transmitted to a remote device such as, but not limited to, the remote computing device 106. In this implementation, the set of achievement rules does not have to be sent to the device 104. Instead, the remote computing device 106 can aggregate the user viewing data from various viewing sessions and evaluate the user viewing data against the set of achievement rules. The set of achievement rules can be stored locally at the remote computing device 106 or may be retrieved from a different computing device. Notification of any awarded achievement can be sent to the device 104.

Figure 2:
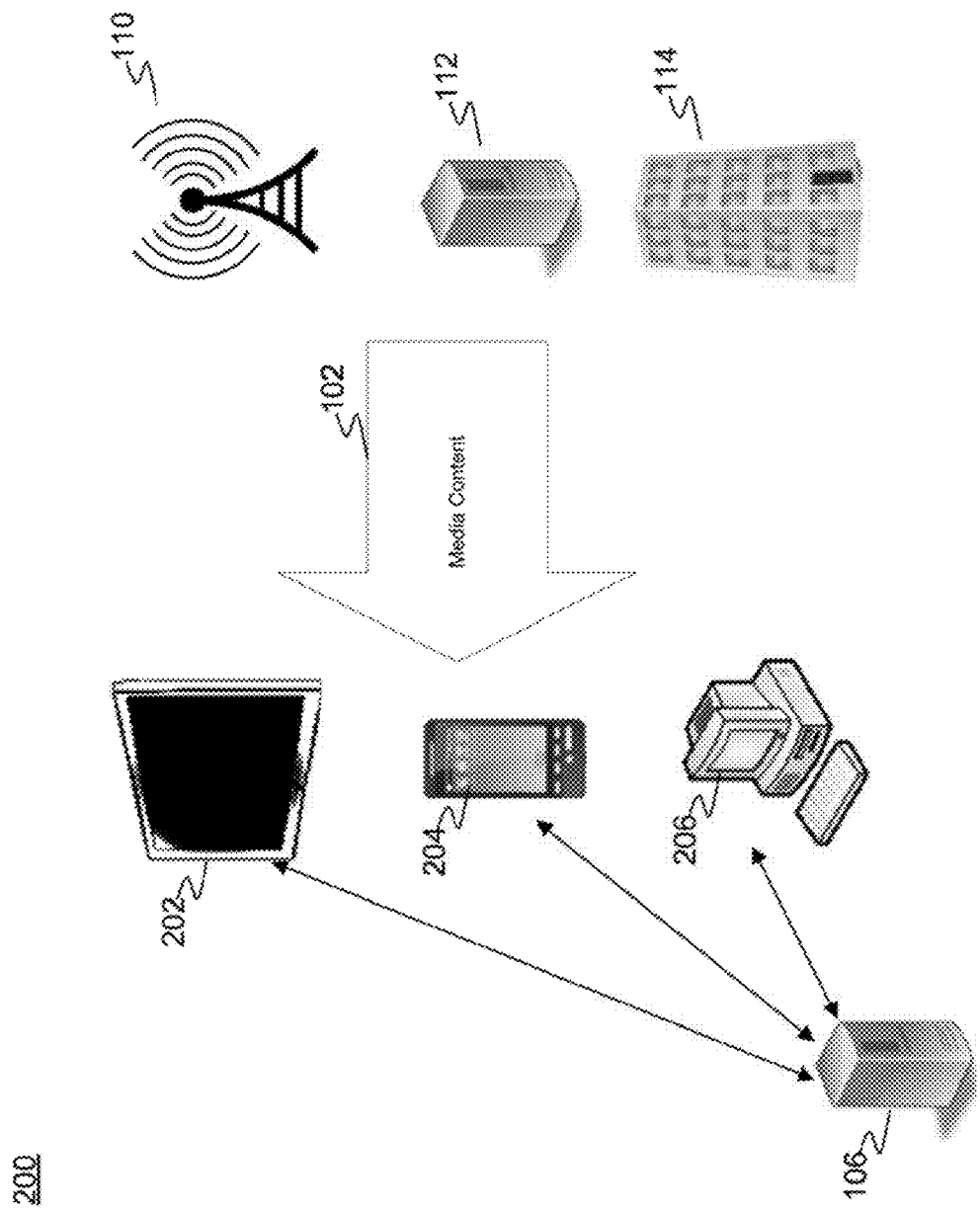
FIG. 2 illustrates a block diagram of an example of a media viewing achievement system in accordance with an illustrative implementation.

FIG. 2 illustrates a block diagram of an example of a media viewing achievement system in accordance with an illustrative implementation. Similar to the system 100 of FIG. 1, system 200 includes media content 102 that is provided from the various content providers 110, 112, and 114. A user can watch the media content 102 on any of the devices 202, 204, and 206. The devices can include, but are not limited to, a television 202, cell phone 204, a computing device 206, a personal digital assistant, a notebook, a tablet computing devices, etc. In some embodiments, the features of the remove computing device 106 can be integrated into one or more devices 202, 204, and/or 206.

A user can login to any of the devices 202, 204, and/or 206, by providing a username and optionally a password. Upon receiving the username, the devices 202, 204, and/or 206 associate the content received as being watched by the user. User viewing data can be collected at one or more of the devices. The user viewing data can be sent by the devices to a remote computing device 106. The remote computing device 106 can aggregate the user viewing data for a particular user across multiple devices and multiple viewing sessions. The set of achievement rules can then be used to determine if a user's aggregated user viewing data results in the awarding of an achievement. As described above, the notification of an award can be communicated to the user through one or more devices.

The set of achievement rules includes one or more individual achievement rules. An achievement rule includes a name and one or more criteria that are based upon user viewing data. Various achievements can be created using various criteria. Achievements can be created by various individuals and/or organizations. For example, a television network can create an achievement rule based upon if another user watches a certain number of fall pilots on the television network. As another example, a user can create an achievement rule based upon if a user watches a predetermined number of the user's favorite shows. As yet another example, a user can create an achievement rule based upon if a user watches a program at the time of original airing rather than time shifting the display of the program. The set of achievement rules for a particular user can include achievement rules from a service provider, such as a cable provider, television platform provider, etc. In addition, the set of achievement rules can also include achievement rules created by the user or added by the user. For example, a user can add achievement rules that have been shared with the user from other users. As an example, an achievement rule can be shared with friends through social media networks, email, etc.

Using various criteria, various achievement rules can be created. Exemplary achievement rules that can be created include, but are not limited to, an achievement rule for:
  watching every episode of a series;
  watching all fall pilots for a particular network;
  watching every available sports event for a particular team;
  watching a predetermined amount of television within a period of time;
  watching media without fast forwarding;
  viewing a predetermined number of channels within a predetermined period of time;
  watching a particular program, series, season, as live broadcasts;
  watching a program in picture-in-picture;
  watching a program and concurrently requesting data relating to the program; and
  watching media on different devices and/or different types of devices.

An achievement may require that a number of criteria be met before a particular achievement is awarded. Various achievements can be created by adding different criteria. For example, an achievement rule can be created that awards an achievement when a user has viewed each episode in a particular season for a television series. The user viewing data can be used to determine if a particular episode was viewed completely. As episodes are watched by the user, the user will complete one or more criteria of this rule. The completed criteria can be stored, such that additional user viewing data collected is not compared to completed criteria. An indication of a user's progress in achieving a particular award can be communicated to the user. For example, an indication that a user has watched all but one episode of a series can be provided to the user. The indication can include information on what further user viewing data is required to achieve an award. In addition, the indication can provide a link to a search regarding the missing media or to the missing media that needs to be viewed.

Achievements can also be awarded based upon user viewing data that is associated with multiple users. For example, a media viewing device can allow multiple users to login at the same time. As an example, three people can login into a media device and watch a particular program. The user viewing data can be generated for each of the three viewers. The user viewing data for a particular user can include information regarding the other two viewers. Achievements can be created that include criteria regarding watching media content with other users. For example, an achievement can be created for a user that has watched a predefined amount of media with more than a predefined number of people. In this example, an achievement can be awarded to one person but not necessarily to the entire group of users. As another example, an achievement can be created based upon two or more users watching a full season of a media program together. In this example, an achievement can be awarded to each user.

Figure 3:
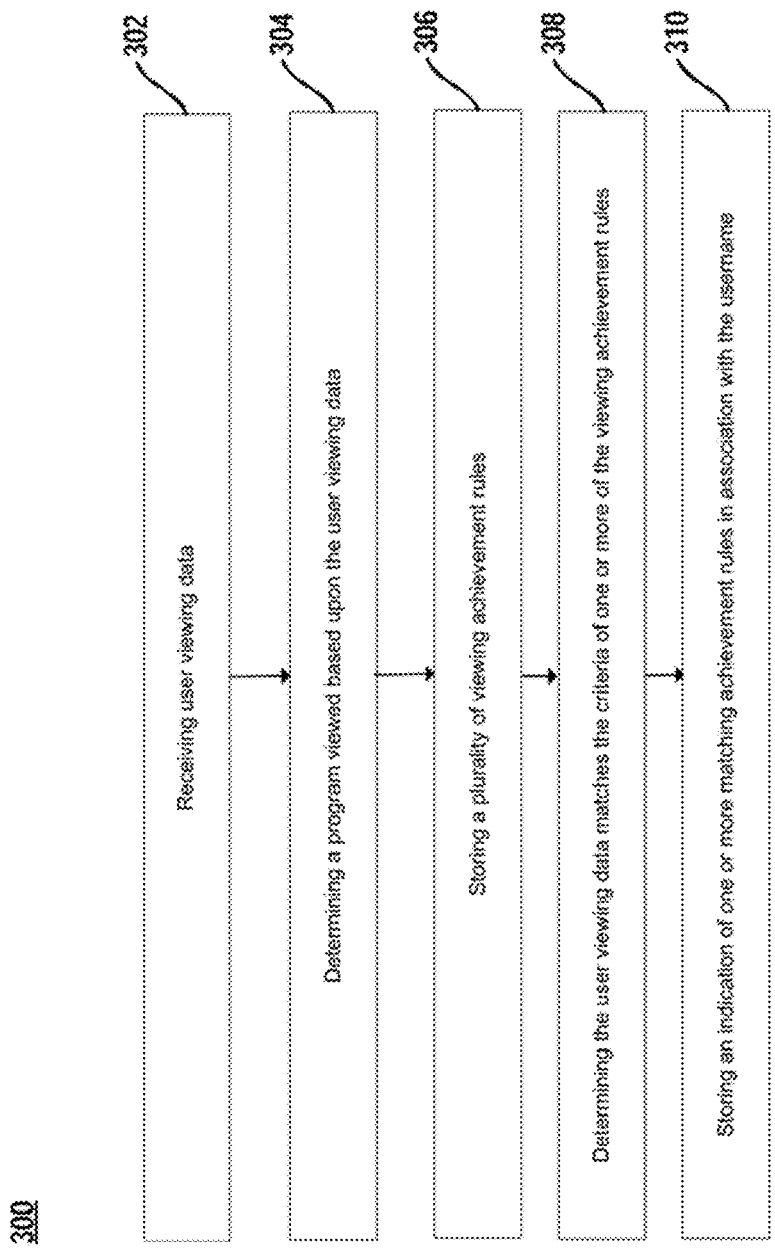
FIG. 3 is a flow diagram of a process for awarding achievements based upon media viewing data in accordance with an illustrative implementation.

FIG. 3 is a flow diagram of a process for awarding achievements based upon media viewing data in accordance with an illustrative implementation. The process 300 can be implemented on a computing device. In one implementation, the process 300 is encoded on a computer-readable medium that contains instructions that, when executed by a computing device, cause the computing device to perform operations of the process 300.

The process 300 includes receiving user viewing data (302). For example, the device 104 can passively collect the actions received from a user. This information can be processed at the device 104 and/or transmitted to a remote computing device 106. Additional user viewing data can be derived from the received user viewing data. A program viewed can be determined based upon the received user viewing data (304). The user viewing data is associated with a particular user using a username, user identifier, cookie, etc. In addition, user viewing data such as if the user viewed a particular episode in its entirety, how much media has been viewed over a particular period of time, etc. can be determined based upon the received user viewing data. In addition, the received user viewing data can be combined with previously received user viewing data.

A set of viewing achievement rules can be received and stored (306). For example, an initial set of viewing achievement rules can be stored. At a later time, updates/changes to the viewing achievement rules can be received and stored. In one implementation, the viewing achievement rules can be stored on device 104. In another implementation, remote computing device 106 can receive and store the set of viewing achievement rules. Once the user viewing data has been received, the user viewing data can be applied to one or more of the viewing achievement rules to determine if the user viewing data matches the criteria of one or more of the viewing achievement rules (308). In one implementation, an indication of whether each criterion has been matched is also stored. This allows the identification of the number of specific criteria that must be matched before the viewing achievement rule is complete. An indication of each matching achievement rule is stored in association with the username (310). A user can access all of the matching achievements through a particular media source, a web page, email, social networking sites, etc. In another implementation, viewing achievement rules that have not been fully matched can also be provided to a user. For example, a user can access all matching achievements as well as any achievement that has been 50%, 75%, 90%, etc. completed via a web page, etc. Information regarding what criteria remain to be completed to complete each incomplete viewing achievement award can also be provided to the user.

Figure 4:
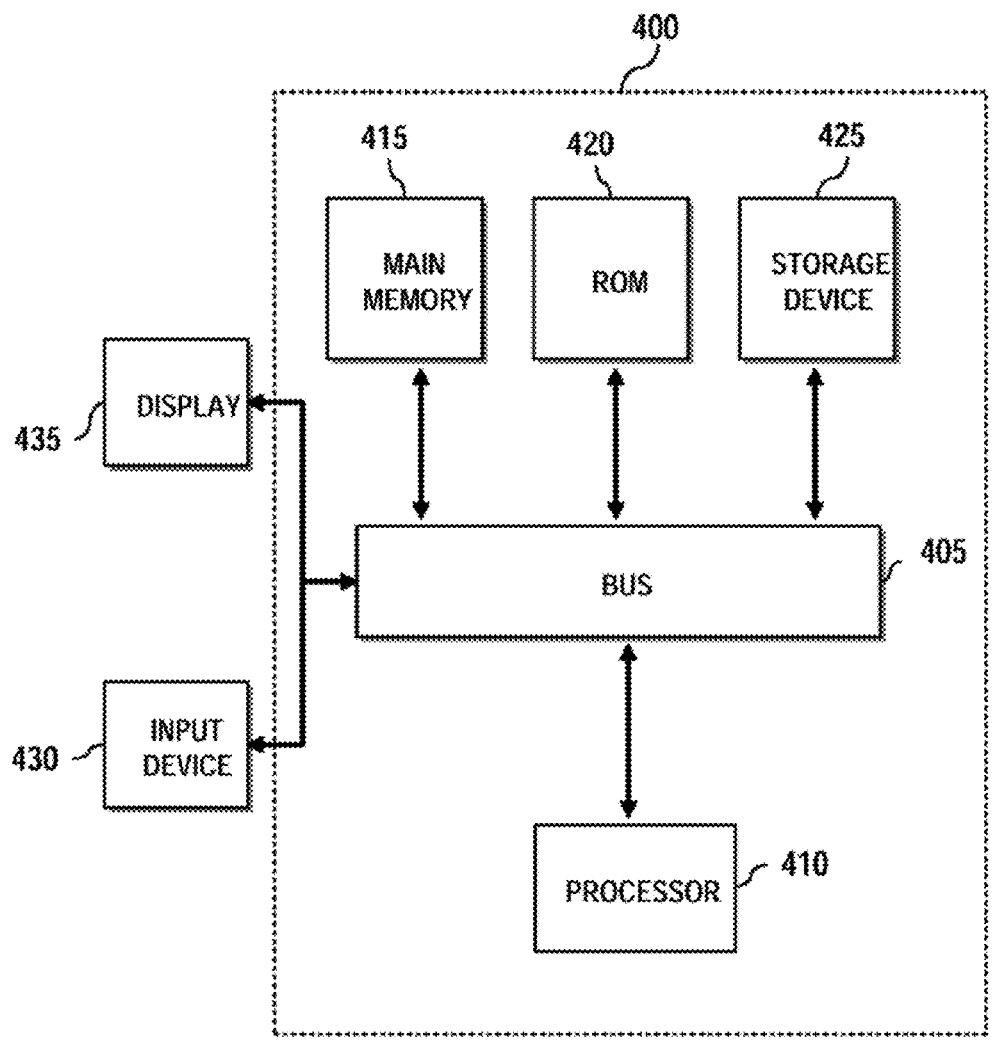
FIG. 4 is a block diagram of a computer system in accordance with an illustrative implementation.

FIG. 4 is a block diagram of a computer system in accordance with an illustrative implementation. The computer system or computing device 400 can be used to implement devices 104, 202, and 204 and/or the remote computing device 106, etc. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating media viewing achievements, comprising:
    receiving user viewing data that indicates media assets presented on a first media viewing device;
    identifying a plurality of viewing achievement rules, wherein each of the plurality of viewing achievement rules is associated with one or more criteria;
    determining, using a hardware processor, whether the one or more criteria associated with at least one of the plurality of viewing achievement rules have been met based at least in part on the received user viewing data; and
    in response to determining that the one or more criteria for a viewing achievement rule from the plurality of viewing achievement rules have not been met, causing an indication of additional user viewing data needed to meet the one or more criteria of the viewing achievement rule to be presented, wherein the indicator includes a link to at least one media asset associated with the additional user viewing data to be presented.

2. The method of claim 1, wherein the user viewing data includes user viewing data associated with a plurality of users.

3. The method of claim 2, wherein the viewing achievement rule includes criteria that the media asset was presented to at least a predetermined number of users.

4. The method of claim 2, wherein the viewing achievement rule includes criteria that an entire series of a program was presented to the plurality of users.

5. The method of claim 2, further comprising, in response to determining that the one or more criteria associated with the viewing achievement rule has been met, causing a second indication of the viewing achievement rule to be presented to the plurality of users.

6. The method of claim 1, wherein the viewing achievement rule is received from a social networking site, and wherein the viewing achievement rule is associated with a social networking user of the social networking site that is connected to the user associated with the user viewing data.

7. A system for generating media viewing achievements, the system comprising:
    a hardware processor that is configured to:
        receive user viewing data that indicates media assets presented on a first media viewing device;
        identify a plurality of viewing achievement rules, wherein each of the plurality of viewing achievement rules is associated with one or more criteria;
        determine whether the one or more criteria associated with at least one of the plurality of viewing achievement rules have been met based at least in part on the received user viewing data; and
        in response to determining that the one or more criteria for a viewing achievement rule from the plurality of viewing achievement rules have not been met, cause an indication of additional user viewing data needed to meet the one or more criteria of the viewing achievement rule to be presented, wherein the indicator includes a link to at least one media asset associated with the additional user viewing data to be presented.

8. The system of claim 7, wherein the user viewing data includes user viewing data associated with a plurality of users.

9. The system of claim 8, wherein the viewing achievement rule includes criteria that the media asset was presented to at least a predetermined number of users.

10. The system of claim 8, wherein the viewing achievement rule includes criteria that an entire series of a program was presented to the plurality of users.

11. The system of claim 8, wherein the hardware processor is further configured to, in response to determining that the one or more criteria associated with the viewing achievement rule has been met, cause a second indication of the viewing achievement rule to be presented to the plurality of users.

12. The system of claim 7, wherein the viewing achievement rule is received from a social networking site, and wherein the viewing achievement rule is associated with a social networking user of the social networking site that is connected to the user associated with the user viewing data.

13. A non-transitory computer-readable medium containing computer executable instructions that, when executed by a processor, cause the processor to perform a method for generating media viewing achievements, the method comprising:

receiving user viewing data that indicates media assets presented on a first media viewing device;

identifying a plurality of viewing achievement rules, wherein each of the plurality of viewing achievement rules is associated with one or more criteria;

determining whether the one or more criteria associated with at least one of the plurality of viewing achievement rules have been met based at least in part on the received user viewing data; and in response to determining that the one or more criteria for a viewing achievement rule from the plurality of viewing achievement rules have not been met, causing an indication of additional user viewing data needed to meet the one or more criteria of the viewing achievement rule to be presented, wherein the indicator includes a link to at least one media asset associated with the additional user viewing data to be presented.

14. The non-transitory computer-readable medium of claim 13, wherein the user viewing data includes user viewing data associated with a plurality of users.

15. The non-transitory computer-readable medium of claim 14, wherein the viewing achievement rule includes criteria that the media asset was presented to at least a predetermined number of users.

16. The non-transitory computer-readable medium of claim 14, wherein the viewing achievement rule includes criteria that an entire series of a program was presented to the plurality of users.

17. The non-transitory computer-readable medium of claim 14, wherein the method further comprises, in response to determining that the one or more criteria associated with the viewing achievement rule has been met, causing a second indication of the viewing achievement rule to be presented to the plurality of users.

18. The non-transitory computer-readable medium of claim 13, wherein the viewing achievement rule is received from a social networking site, and wherein the viewing achievement rule is associated with a social networking user of the social networking site that is connected to the user associated with the user viewing data.

\* \* \* \* \*